W. UTIGARD.
SPOON HOLDING SUGAR BOWL
APPLICATION FILED JUNE 26, 1908.
899,357.
Patented Sept. 22, 1908.
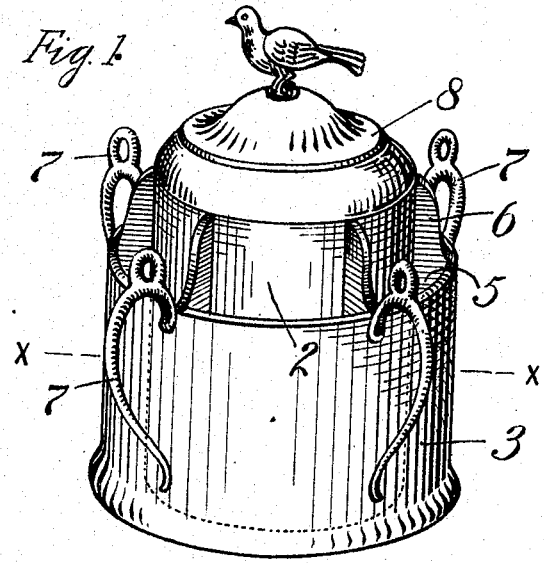
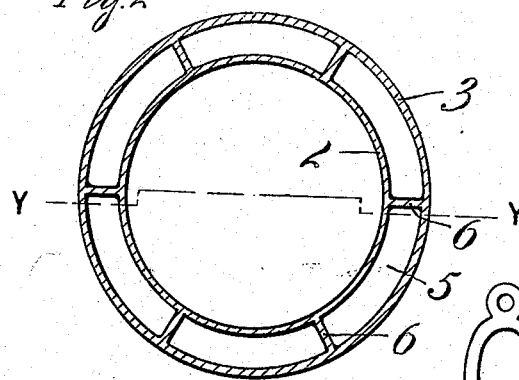
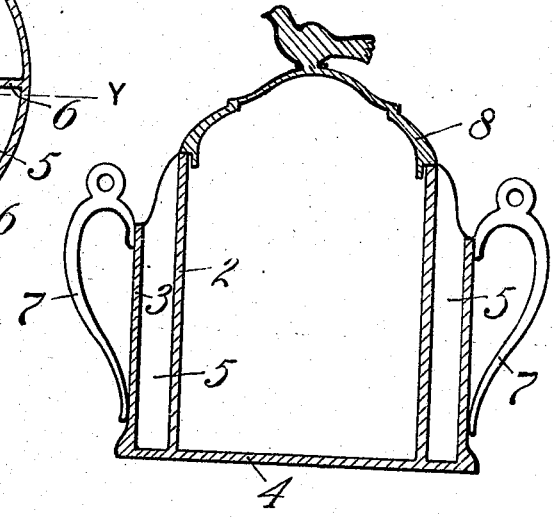
Witnesses,
George Voelker
Inventor:
Wilhelmine Utigard
by Lothrop & Johnson
her Attorneys.

UNITED STATES PATENT OFFICE.

WILHELMINE UTIGARD, OF THEILMAN, MINNESOTA.

SPOON-HOLDING SUGAR-BOWL.

No. 899,357.  Specification of Letters Patent.  Patented Sept. 22, 1908.

Application filed June 26, 1908. Serial No. 440,474.

*To all whom it may concern:*

Be it known that I, WILHELMINE UTIGARD, a citizen of the United States, residing at Theilman, in the county of Wabasha and State of Minnesota, have invented certain new and useful Improvements in Spoon-Holding Sugar-Bowls, of which the following is a specification.

My invention relates to improvements in spoon-holding sugar bowls for table use, the object of the invention being to provide a sugar bowl having means for holding and carrying spoons in upright position.

To that end the invention consists in the construction, combination and arrangement of parts hereinafter described and claimed.

In the accompanying drawings forming part of this specification, Figure 1 is a perspective view of my improved sugar bowl, Fig. 2 is a horizontal section on line $x$—$x$ of Fig. 1, omitting the handles, and Fig. 3 is a vertical section on line $y$—$y$ of Fig. 2.

As shown in the drawings the sugar bowl comprises an inner shell 2, preferably cylindrical in shape, constituting the sugar receptacle proper, and an outer shell 3. The shells have a common base or bottom 4 to which they are secured or with which they are made integral. The outer shell is larger in diameter than the inner shell so as to leave between the shells a space 5 which forms the spoon-holding receptacle. The outer shell 3 is of less height than the inner shell 2, so that the handles of the spoons may be exposed and readily grasped by the user when it is desired to take one from the spoon-receptacle.

The spoons are held in upstanding position by means of a plurality of vertical partitions 6 which are bridged across the space between the two shells and divide the spoon-receptacle into sections shorter than the length of a spoon. These partitions also serve to keep the shells apart and to support one upon the other, thus strengthening the construction. The partitions preferably extend up beyond the outer shell so as to support the spoons in as upright a position as possible. The bowl is made preferably of sheet metal and is provided with handles 7 and a cover 8.

Although I have called the vessel a "sugar bowl" it is obvious that it can be used for other articles of food.

I claim as my invention:

1. A bowl of the class described comprising an inner shell and an outer shell, the outer shell being spaced apart from the inner shell to form a receptacle for spoons, and a plurality of partitions bridged across the spoon receptacle so as to divide the same into sections.

2. A vessel of the class described comprising an inner shell, an outer shell surrounding the inner shell and spaced apart therefrom to form a receptacle for spoons, a common bottom for said shells, and a plurality of partitions arranged in the spoon receptacle to hold the spoons in upstanding position, the inner shell being higher than the outer shell for the purpose set forth.

In testimony whereof I affix my signature in presence of two witnesses.

WILHELMINE UTIGARD.

Witnesses:
 FRED KNOMP,
 ARTHUR SCHLEICHER.